Jan. 9, 1968     T. H. SPARGER     3,362,345
STUFFING BOX
Filed April 7, 1966     2 Sheets-Sheet 1
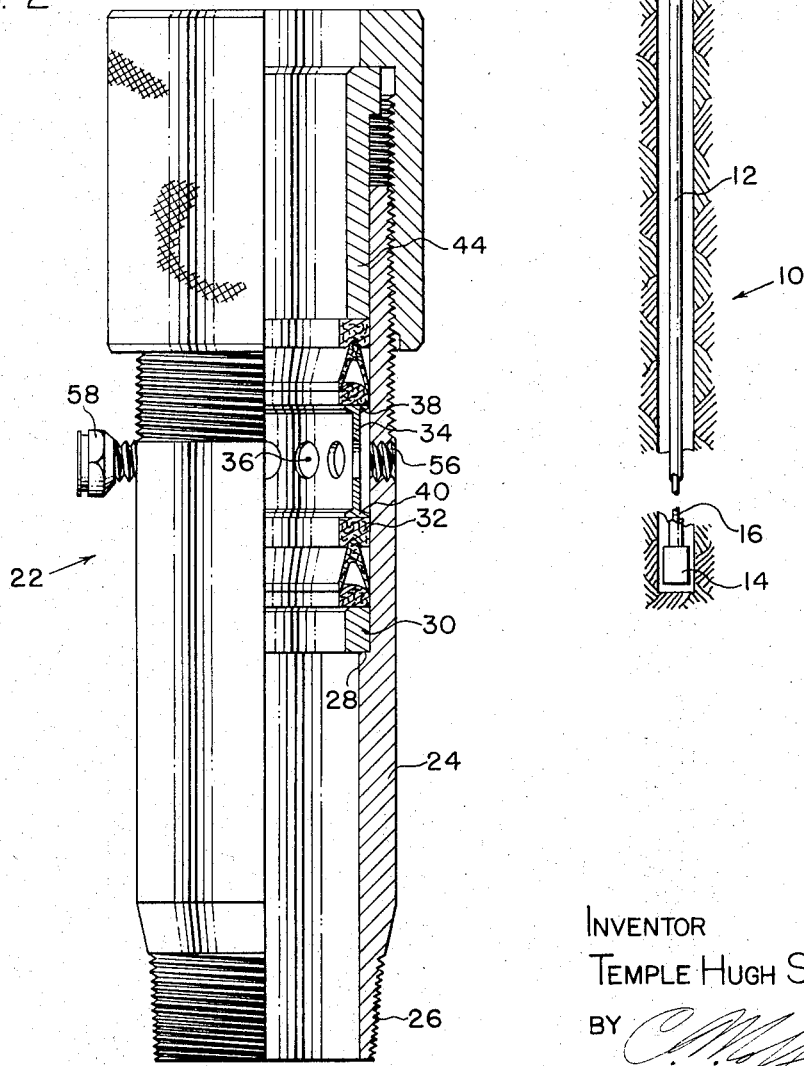
INVENTOR
TEMPLE HUGH SPARGER Jan. 9, 1968    T. H. SPARGER    3,362,345
STUFFING BOX
Filed April 7, 1966    2 Sheets-Sheet 2

INVENTOR
TEMPLE HUGH SPARGER
BY
Atty.

United States Patent Office 3,362,345
Patented Jan. 9, 1968

3,362,345
STUFFING BOX
Temple H. Sparger, P.O. Box 1492,
Denver City, Tex. 79323
Filed Apr. 7, 1966, Ser. No. 540,950
8 Claims. (Cl. 103—202)

ABSTRACT OF THE DISCLOSURE

A stuffing box for an oil well uses sintered "Teflon" as its main packing element. The "Teflon" is held within a lantern ring.

---

This invention relates to stuffing boxes and, more particularly, to a stuffing box wherein the packing is sintered "Teflon."

Oil Center Research of Lafayette, La., has developed a product from sintered "Teflon" which they market under the trademark "Liquid-O-Ring" packing. Although this product "Liquid-O-Ring" was developed for uses of packing, no packing gland or stuffing box has been specifically designed for its use.

More particularly, no stuffing box has been specifically designed for the use of this product in connection with the stuffing box of an oil well. Oil well stuffing boxes present special problems due to the great weight upon the rods extending through the stuffing box, the corrosive and abrasive nature of the fluid being pumped, and the frequent problem of misalignment.

A goal to achieve with this invention is for the polish rod to contact only the "Teflon" packing in the stuffing box and to center the rod by the packing and for the rod not to contact the metal parts of the stuffing box. In this regard, the clearance between the rod and the metal elements of the stuffing box is greater than would otherwise occur.

One of the advantages of this new stuffing box is its compact size. Not only is this stuffing box quite short in length, it is also quite narrow in diameter. Therefore, it is well adapted to be used upon multiple completion wells with two or three strings of tubing with stuffing boxes placed quite close together.

An object of this invention is to provide an improved stuffing box.

Another object is to provide an improved stuffing box for oil wells.

Further objects are to achieve the above with a device that is sturdy, compact, durable, simple, safe, and reliable, yet inexpensive and easy to manufacture, install, operate, and maintain.

The specific nature of the invention, as well as other objects, uses, and advantages thereof, will clearly appear from the following description and from the accompanying drawing, the different views of which are not necessarily to the same scale, in which:

FIG. 1 is a schematic representation of an oil well showing the environment of the use of the invention.

FIG. 2 is a half-sectional view of my improved stuffing box.

Figure 3:
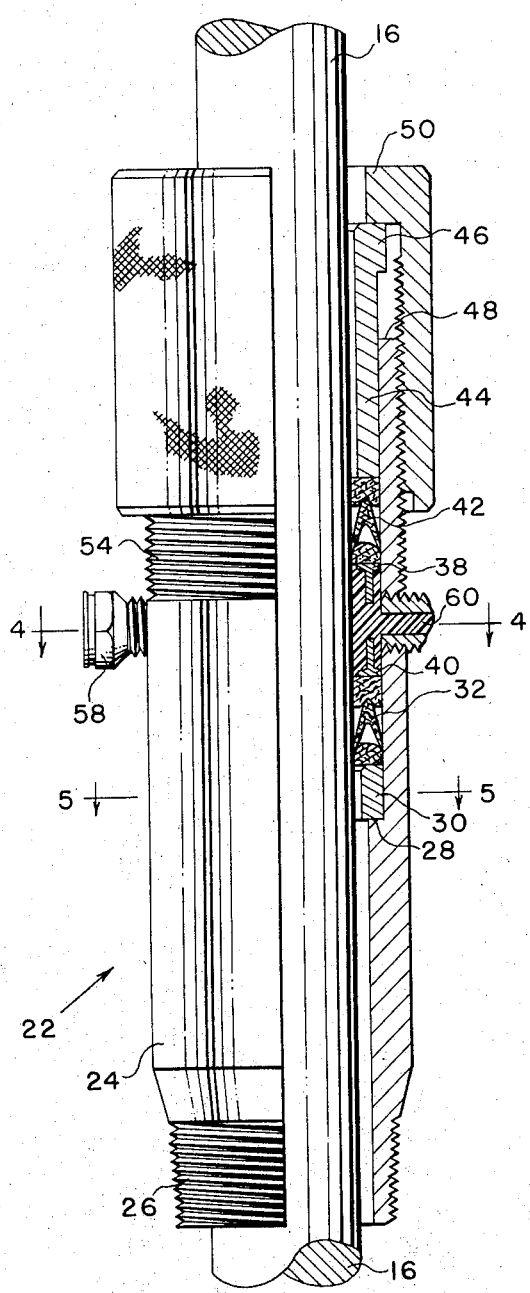
FIG. 3 is a half-sectional view similar to FIG. 2, with the addition of showing the rod telescoped within the stuffing box and showing the pressurized paste packing in the stuffing box.
Figure 4:
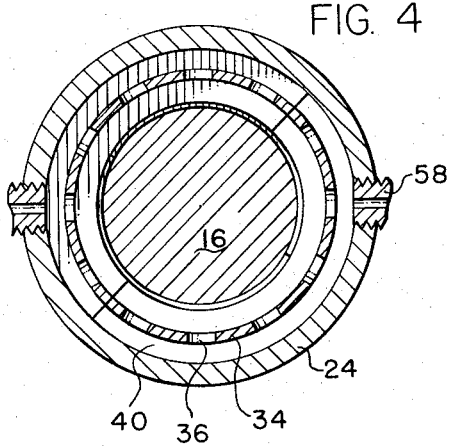
FIG. 4 is a cross-sectional view taken on line 4—4 of FIG. 3, with the size of the parts distorted and not showing the pressurized paste packing in place for clarity.
Figure 5:
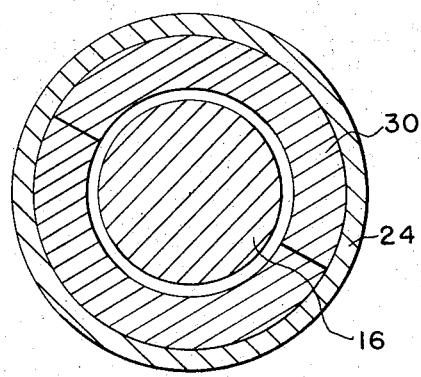
FIG. 5 is a cross-sectional view taken on line 5—5 of FIG. 3, with the thickness of parts distorted for clarity.

Referring more particularly to the drawing, FIG. 1 represents a typical oil well 10. The oil well includes the string of tubing 12 which extends far beneath the surface of the ground to pump 14 on the bottom of the tubing. The pump is operated by sucker rod 16 which extends from the pump 14 to pump jack 18 which forms a means for reciprocating the rod. Production pipe 20 is attached to the tubing 12 below stuffing box 22.

The stuffing box 22 has as one of its main elements tubular sleeve 24 which forms its body (FIGS. 2 and 3). The sleeve has threads 26 at the bottom thereof which form means to attach the sleeve to the string of tubing 12. The upper portion of the sleeve 24 is counter-bored, thus forming upward facing shoulder 28 in its interior. Brass bottom ring 30 is seated upon the shoulder 28. The brass ring is formed of two semi-circular members so that it may be placed around the rod 16 which is co-axial with the sleeve 24. The ring 30 surrounds the rod 16. There is considerable clearance between the ring 30 and the rod 16. In ordinary commercial use, the rod 16 will be approximately 1½ inches in diameter. (In use, this may vary from as small as one inch to as great as 1¾ inches.) I have found it desirable to make the inside diameter of the ring 1/16 inch greater than the outside diameter of the rod 16. Therefore, if 1½ inch rod 16 were used, the inside diameter of the ring 30 would be 1 9/16 inches. Approximately 0.030 inch clearance exists between the rod 16 and the ring 30.

Fiber "Chevron" packing 32 is placed above the ring 30. The fiber packing 32 is in three elements. Inasmuch as this type packing is well known to the art, it will not be further discussed or described here.

Brass lantern ring 34 is immediately above the fiber packing 32. The lantern ring also surrounds the rod 16 and is formed from a pair of hemi-cylindrical members having a plurality of perforations 36 therethrough. The lanter ring 34 has a rather thin web in the middle with flange 38 at the upper edge and flange 40 at the lower edge. The inside diameter of these flanges 38 and 40 are the same and the inside diameter is the same as that of the ring 30. Therefore, there is ample clearance between this metal member and the rod 16. Also, the outside diameter of each of these flanges 38 and 40 is substantially the same as that of the counter-bore of the sleeve 24. Therefore, these members fit into the sleeve 24 so that the rings are in contact with the sleeve. Of course, it will be understood by those skilled in the art that there would be a slight clearance for ease in assembling; however, other than regular machine work tolerances, this clearance is maintained at a minimum. The outside diameter of the ring 30 is the same as the outside diameter of the flanges of the lantern ring 34.

Another section of "Chevron" fiber packing 42 surrounds the rod 16 immediately above the lantern ring 34.

The packing and particularly the fiber packing 32 and 42 is held firmly in place by split brass tubular plunger 44. The inside diameter of the plunger is the same as the ring 30 and the lantern ring 34 above described.

The outside diameter of the plunger 44 is the same as the outside diameter of the bottom ring 30 and lantern ring 34. Outward extending flange 46 at the top of the plunger is greater in diameter than the upper edge 48 of the sleeve 24. The plunger 44 is limited in its downward travel by the flange 46. The plunger 44 is also split, i.e., formed of two hemi-cylindrical brass members.

Cuff 52 is threaded by threads 54 onto the sleeve 24. Inward turned flange 50 of the cuff 52 pushes against the flange 46. Thus, means is provided for pressing the plunger 44 downward.

Opposite the perforations 36 in the lantern ring 34, the sleeve 24 is drilled and tapped with holes 56 for the attachment of grease fittings 58. Grease fittings 58 are standard conventional items and readily available on the market and they include exterior surfaces for coupling a grease gun (not shown) thereto, as well as internal check valves so that, when pressurized packing 60 is inserted into the stuffing box, it remains pressurized. Inasmuch as grease fittings are well known commercial items, they will not be discussed further.

In operation, the stuffing box is assembled upon the well inconventional manner and the cuff 52 is screwed down firmly with hand pressure. After assembly, a grease gun (not shown) filled with "Liquid-O-Ring" type sintered "Teflon" packing is attached to the grease fittings 58 and the stuffing box filled with paste packing at pressures normally produced by grease guns, i.e., 2500 p.s.i. to 3000 p.s.i. Thereafter the well 10 is ready for operation and, upon activation of the pump jack 18, the well is pumped.

When the paste packing is pressurized into the stuffing box, it is maintained in the area of the latern ring by the fiber packing 32. Also, paste packing 60 completely fills the area around the lantern ring 34, flowing through the perforations 36 in the lantern ring. The packing 60 centralizes or centers the rod 16 so that the rod is co-axial with the sleeve 24 and the string of tubing 12.

After thirty or forty minutes of operation, it is customary to check the operation of the well and, at that time, add more paste packing 60. Thereafter, periodic checks are necessary. If the packing is not holding, a small amount of the oil will seep by the packing and is readily seen upon visual inspection. When this occurs, additional paste packing is added by grease gun so that the leakage is maintained at a minimum.

It will be apparent that the embodiment shown is only exemplary and that various modifications can be made in operation, construction, materials, and arrangement within the scope of the invention as defined in the appended claims.

I claim as my invention:

1. A stuffing box comprising
   (a) a tubular sleeve,
   (b) means on the lower end of the sleeve for attaching the sleeve to tubing,
   (c) a rod co-axially telescoped within the tubing,
   (d) an internal shoulder in the sleeve,
   (e) a bottom ring formed of two semi-circular members surrounding the rod and seated on said shoulder,
   (f) a plunger tube formed of two hemi-cylindrical members surrounding the rod within the sleeve above the bottom ring,
   (g) means on the sleeve for pressing the plunger downward, and
   (h) means in the sleeve between the bottom ring and plunger tube for introducing pressurized paste packing in the form of sintered "Teflon" between the bottom ring and plunger tube,
   (j) there being considerable clearance between the bottom ring and rod and the plunger tube and rod,
   (k) the clearance between the sleeve and the rod being greater than between the bottom ring and rod
   (m) said tubular sleeve attached by the means on its lower end to a string of oil well tubing,
   (n) a pump at the bottom of said tubing,
   (o) a pump jack attached to the top of said rod, and
   (p) the bottom of said rod attached to said pump.

2. The invention as defined in claim 1 with the addition of
   (q) a lantern ring between the bottom ring and plunger tube,
   (r) said lantern ring formed of two hemi-cylindrical perforated members with a flange at the top and bottom extending both outwardly and inwardly,
   (s) there being about the same clearance between the lantern ring and rod as between the bottom ring and rod and as between the plunger tube and rod.

3. The invention as defined in claim 1 with the addition of
   (q) pressurized paste packing in the form of sintered "Teflon" between the bottom ring and plunger tube,
   (r) flexible fiber packing above and below the paste packing,
   (s) said flexible fiber packing contacting both the rod and the sleeve, thus confining the paste packing.

4. The invention as defined in claim 3 with the addition of
   (t) a lantern ring between the bottom ring and plunger tube,
   (u) said lantern ring formed of two hemi-cylindrical perforated members with a flange at the top and bottom extending both outwardly and inwardly,
   (v) there being about the same clearance between the lantern ring and rod as between the bottom ring and rod and as between the plunger tube and rod.

5. The invention as defined in claim 3 wherein
   (t) said means for introducing pressurized paste packing includes grease fittings screwed into holes in the sleeve.

6. The invention as defined in claim 5 with the addition of
   (u) a lantern ring between the bottom ring and plunger tube,
   (v) said lantern ring formed of two hemi-cylindrical perforated members with a flange at the top and bottom extending both outwardly and inwardly,
   (w) there being about the same clearance between the lantern ring and rod as between the bottom ring and rod as between the plunger tube and rod.

7. The invention as defined in claim 4 wherein
   (w) the clearance between the bottom ring and the rod is about the same as between the plunger and the rod and is approximately 0.030 inch, 8. The invention as defined in claim 6 wherein
   (x) the clearance between the bottom ring and the rod is about the same as between the plunger and the rod and is approximately 0.030 inch.

References Cited
UNITED STATES PATENTS

| 2,992,028 | 7/1961 | Knox | 277—1 |
| 3,199,876 | 8/1965 | Magos et al. | 277—72 X |

FOREIGN PATENTS

| 922,234 | 3/1963 | Great Britain. |

ROBERT M. WALKER, *Primary Examiner.*